Nov. 23, 1926. 1,608,336
V. RANDALL
SAFETY BUMPER FOR MOTOR CARS
Filed June 22, 1926
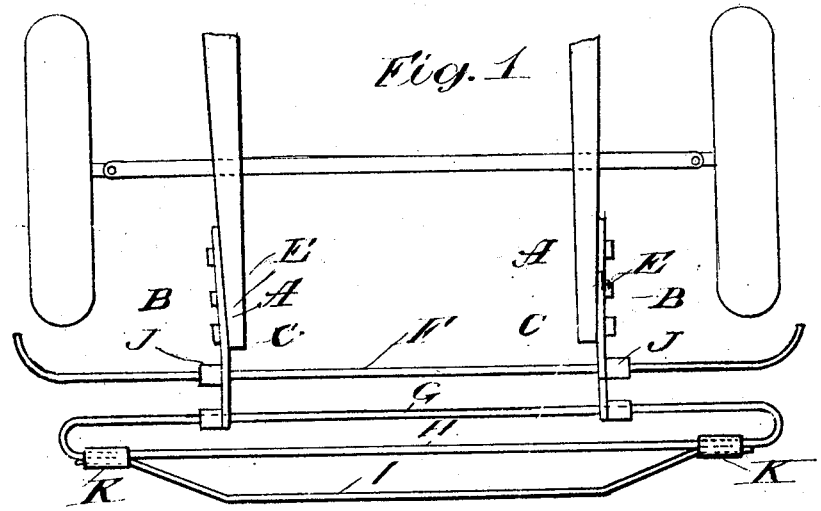
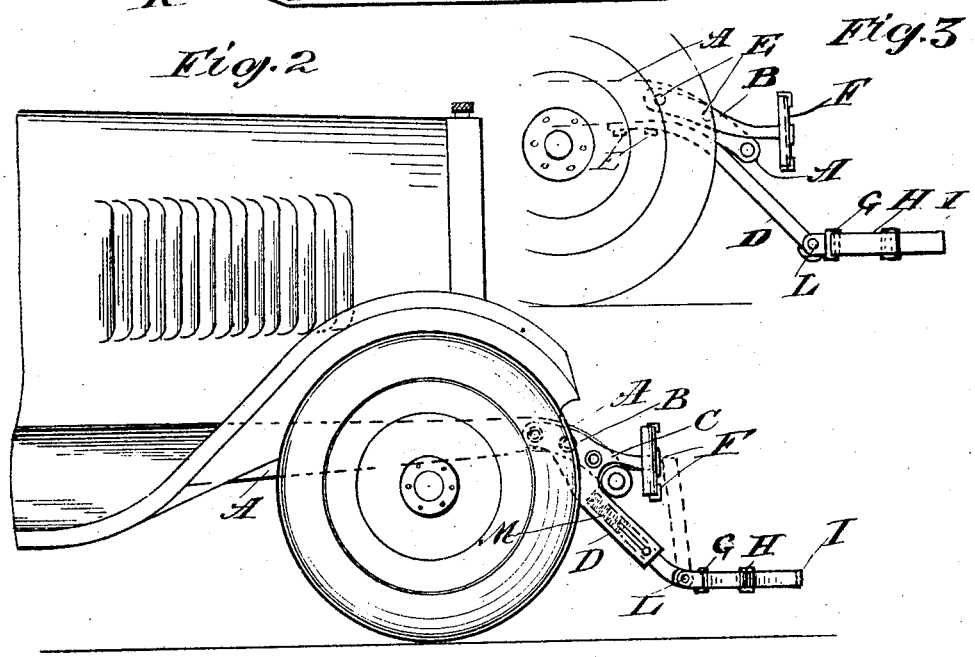
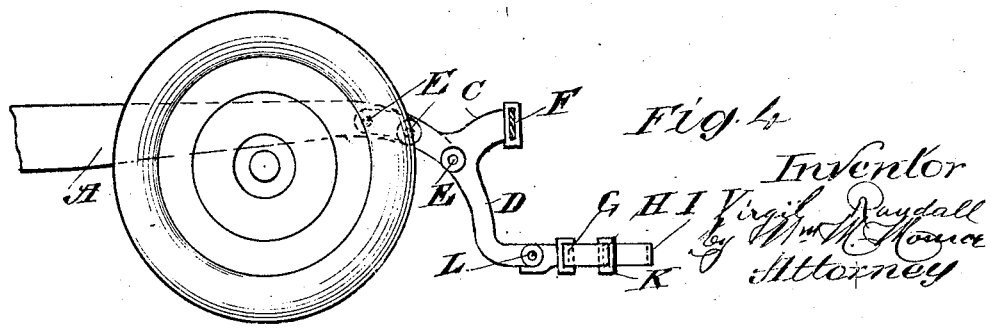

Patented Nov. 23, 1926.

1,608,336

UNITED STATES PATENT OFFICE.

VIRGIL RANDALL, OF SHAKER HEIGHTS, OHIO.

SAFETY BUMPER FOR MOTOR CARS.

Application filed June 22, 1926. Serial No. 117,689.

The objects of the invention are to provide an improved auxiliary fender for automobiles that is adapted to prevent the action of the standard bumper from throwing a pedestrian upon his back and fracturing his skull when struck by the machine. To accomplish this result an auxiliary bumper is hung at a lower level and in advance of the standard bumper. The auxiliary bumper is designed to strike the pedestrian below the knees and therefore the result of the blow is not to throw him forward in such a manner that his skull will strike upon the pavement, but will have the action of causing him to fall toward the rear and hence he will be caught upon the standard bumper.

In this manner even if the blow should be violent enough to fracture his legs or arms, the skull will not be broken and he will live and in most instances will recover from the injury, which would be practically impossible if his skull had been factured.

To accomplish these results the auxiliary bumper may be made a part of the main bumper and mounted upon a common support or may be independently mounted and may be capable of being attached to any car already provided with a standard form of bumper.

The device is illustrated in the accompanying drawings hereinafter more fully described and specifically pointed out in the claims.

In the accompanying drawings Fig. 1 is a plan of one form of the device;

Fig. 2 is a side elevation thereof and

Fig. 3 is a side elevation of an independent form.

Fig. 4 is a side elevation showing forked brackets.

In these views A, A represent the side frames of the chassis of the car; B, B are brackets forked at their outer ends, at C and D respectively.

These brackets are secured to the side frames in any convenient manner, as by means for bolts E, E. To the upper arm C of the forked brackets, the upper bumper is secured, which may be a spring bumper of any well known type composed of a transverse metal band or bands F. G is the auxiliary bumper which is pivoted upon the lower arm D of the forked bracket and extends in advance of the upper bumper and at a lower level, so as to be the first to engage with the legs of a pedestrian and to engage therewith low enough to cause him to fall against the upper bumper or upon the projecting platform provided by the lower bumper.

This bumper is shown to be constructed of three transverse spring bars of resilient metal. G, H and I. The members G and H comprise a single closed loop formed of a spring band metal attached by means of clamps J, J, to the extremity of the lower bracket arm.

To make the bumper still more resilient the outer band of spring metal I is attached at its extremities to the outer side of the loop H and may slide in guides K, K, if desired. The lower bumper is folded upon the upper bumper when not in use and is hinged at L for this purpose.

To prevent the lower bumper from being broken if it should strike against a rock or other obstruction the lower bracket arms may be formed in two portions slidingly movable on each other and a compression spring M is interposed between their portions, thus adding to the resilience of this bumper.

In Fig. 3 separate brackets N are provided for the lower bumper. In Fig. 4 forked brackets are employed.

Having described the invention, what I claim as new and desire to secure by Letters Patent is:

1. The combination with the side frames of a chassis of a motor car of an upper bumper disposed transversely across the front ends thereof and an auxiliary bumper similarly disposed at a lower level, and in advance of said upper bumper, and common bracket means for attaching the same to the extremities of said frames.

2. The combination with the side frames of a chassis of a motor car of an upper bumper disposed transversely across the front ends thereof and an auxiliary bumper similarly disposed at a lower level, and in advance of said upper bumper, and common bracket means for attaching the same to the extremities of said frames, said lower bumper being yieldingly secured to said attaching means.

3. In a device of the character described, the combination with side frames of forked brackets attached thereto, an upper bumper attached to the upper arms, said forked brackets and a lower bumper positioned in advance of said upper bumper and attached to the lower arms of said forked brackets.

4. In a device of the character described, the combination with side frames of forked brackets attached thereto, an upper bumper attached to the upper arms, said forked brackets and a lower bumper positioned in advance of said upper bumper and attached to the lower arms of said forked brackets, and pivoted therein.

5. In a device of the character described, the combination with side frames of forked brackets attached thereto, an upper bumper attached to the upper arms, said forked brackets and a lower bumper positioned in advance of said upper bumper and attached to the lower arms of said forked brackets, said lower bumper being yieldingly attached to said lower arms.

6. In a device of the character described, an upper spring bumper and a lower spring bumper positioned in advance of said upper bumper, forked brackets to the upper and lower arms to which said bumpers are respectively attached, said lower arms being each made in two portions slidingly movable upon each other, and compressible springs between said arm portions.

7. In a compound bumper, an upper bumper and a lower bumper in advance of the same, and supporting means therefor, said lower bumper comprising a multiple number of horizontally spaced transverse bands of spring metal, said bands being connected together at their ends.

8. In a compound bumper, an upper bumper and a lower bumper in advance of the same, and supporting means therefor, said lower bumper comprising a multiple number of horizontally spaced transverse bands of spring metal, two of said bands being connected together at their ends, in the form of a closed loop said lower bumper being foldable against said upper bumper.

In testimony whereof I affix my signature.

VIRGIL RANDALL.